(12) United States Patent
Tsao

(10) Patent No.: US 6,876,546 B2
(45) Date of Patent: Apr. 5, 2005

(54) ELECTRONIC DEVICE AND CASE FOR THEREOF

(75) Inventor: Shen Chang Tsao, Taoyuan (TW)

(73) Assignees: Averatec Inc., Foothill Ranch, CA (US); Averatec Europe GmbH, Hallbergmoos (DE); Averatec Asia Incorporation, Taipei Hsien (TW)

( * ) Notice: Subject to any disclaimer, the term of this patent is extended or adjusted under 35 U.S.C. 154(b) by 150 days.

(21) Appl. No.: 10/336,736

(22) Filed: Jan. 6, 2003

(65) Prior Publication Data

US 2004/0130862 A1 Jul. 8, 2004

(51) Int. Cl.⁷ .................................................. G06F 1/16
(52) U.S. Cl. ......................... 361/683; 710/14; 362/26; D14/315
(58) Field of Search ................................ 361/680, 683; 710/14, 18; 362/26, 85, 197–199, 155; D14/315

(56) References Cited

U.S. PATENT DOCUMENTS 5,691,880 A * 11/1997 Seto et al. .................. 361/681
5,808,861 A * 9/1998 Nakajima et al. ........... 361/680
5,959,833 A * 9/1999 Youens ....................... 361/681
6,073,187 A * 6/2000 Jacobs et al. .................. 710/14
6,081,207 A * 6/2000 Batio ........................... 361/680
6,561,668 B2 * 5/2003 Katayama et al. ............. 362/85
6,657,854 B2 * 12/2003 Horii et al. .................. 361/683

* cited by examiner

Primary Examiner—Lisa Lea-Edmonds
(74) Attorney, Agent, or Firm—Birch, Stewart, Kolasch & Birch, LLP

(57) ABSTRACT

A case for an electronic device includes a transparent component, a main case body, and a light-transmitting component. In this case, at least a first indicating mark is formed on one surface of the transparent component. The main case body has at least a light-transmitting hole. The transparent component is attached to a surface of the main case body, so that the first indicating mark is set on one side of the light-transmitting hole. The light-transmitting component has at least a light-transmitting portion and is attached to another surface of the main case body corresponding to the transparent component. Therefore, the light-transmitting portion is set on the other side of the light-transmitting hole opposite to the first indicating mark. Furthermore, the invention also discloses an electronic device using the case.

12 Claims, 4 Drawing Sheets

ELECTRONIC DEVICE AND CASE FOR THEREOF

BACKGROUND OF THE INVENTION

1. Field of Invention

The invention relates to an electronic device and a case for thereof and, in particular, to an electronic device and a case used in notebook computers, keyboards, and the like.

2. Related Art

As the design of electronic device trends to be more suitable for human use and convenient for replacement, every designer makes efforts to provide more innovation, in order to make the electronic device more suitable for human use and overcome the troublesome replacement of the electronic device and its elements.

Generally speaking, electronic devices involve a lot. For example, products such as notebook computers and keyboards are called electronic devices. On the whole, most electron devices include a case to protect their circuit boards or relative components.

Therefore, to achieve the convenience for assemblage, the conventional cases for electronic device usually include a upper case and a corresponding lower case.

For example, the main body of a notebook computer includes a first case that is used to assemble the components such as keyboard and touch panel, and a second case. Wherein, the first case further has several status indicating lamps and status indicating marks, so that user can clearly know the status in use. Please refer to FIG. 1 (the local enlarged diagram of the first case), the main case body 100 of the first case has a plurality of light-transmitting hole 100a. Each indicating mark 100b is formed on the main case body 100 directly, via an injection method (to form a concave or convex scar) or direct printing method, adjacent to the individual light-transmitting hole 100a. Via the light of the light-emitting component (not shown) pass though the light-transmitting hole 100a, the status in use of this electronic device can be observed.

In addition, to cooperate with the formation and emitting of the light-emitting component, a light-transmitting component is further formed at the bottom of the first case so as to avoid the exposedness of the light-emitting component, which leads to the damage of itself.

In the mentioned case, each indicating mark 100b is formed on the main case body 100 directly. Therefore, the user can neither distinguish the indicating mark 100b, nor realize the status in used of this electronic component when the electronic device is operated during the night.

Furthermore, due to the direct formation of each indicating mark 100b on the main case body 100, it is necessary to replace the entire main case body 100 while each indicating mark 100b is damaged or undistinguishable. Thus, the cost is induced and the replacement is complex for users. Moreover, due to the direct formation of each indicating mark 100b on the main case body 100, the first case must be replaced when the indicating items is purposed to be changed. This may slow down the market period of the product and reduce the competition ability dramatically.

Hence, it is a big issue of the recent electronic device technology to make users be able to tell the status in use of their electronic devices during the night, to simplify the replacement of the electronic device, and to design more suitable electronic devices.

SUMMARY OF THE INVENTION

According to the topic described above, an objective of this invention is to provide an electronic device and a case for thereof which is able to tell the status in use during the night and convenient for replacement.

The electronic device and case of the invention are major characterized by a transparent component having at least a first indicating mark, which is used to discriminate in the night. Therefore, via the illumination of light-emitting component on the first indicating mark, users can observe the graph of the first indicating mark, and realize the status in use of the electronic device. Moreover, when the first indicating mark is damaged or someone would like to change the indicating marks, the only requirement is the change of the transparent component so as to achieve the objective of convenience for replacement.

Therefore, to achieve the mentioned objective, the electronic device of the invention includes a first case and a second case, wherein the first case further includes a main case body, a transparent component, and a light-transmitting component. In this invention, at least a first indicating mark is formed on a surface of the transparent component. The main case body has at least a light-transmitting hole. The transparent component is attached to a surface of the main case body, so that the first indicating mark is set on one side of the light-transmitting hole. The light-transmitting component has at least a light-transmitting portion, and is attached to another surface of the main case body corresponding to the transparent component. Therefore, the light-transmitting portion is set on the other side of the light-transmitting hole opposite to the first indicating mark. Furthermore, the invention also provides a case for electronic device, which equate to the first case as described above.

To conclude, the electron device and the case of the invention includes a transparent component, and at least one first indicating mark is formed on a surface of the transparent component, corresponding to the position of each light-transmitting hole. As a result, graphs appear via the illumination of the light-emitting component, which helps a lot for users to use electronic device in the night. In addition, if the first indicating mark is damaged or someone would like to change the indicating marks, the only requirement is the change of the transparent component. Thus, convenience for replacement is achieved in the viewpoint of both user and manufacturer.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The electronic device and case according to a preferred embodiment of the present invention will be described herein below with reference to the accompany drawings, wherein the same reference numbers refer to the same elements.

Figure 1:
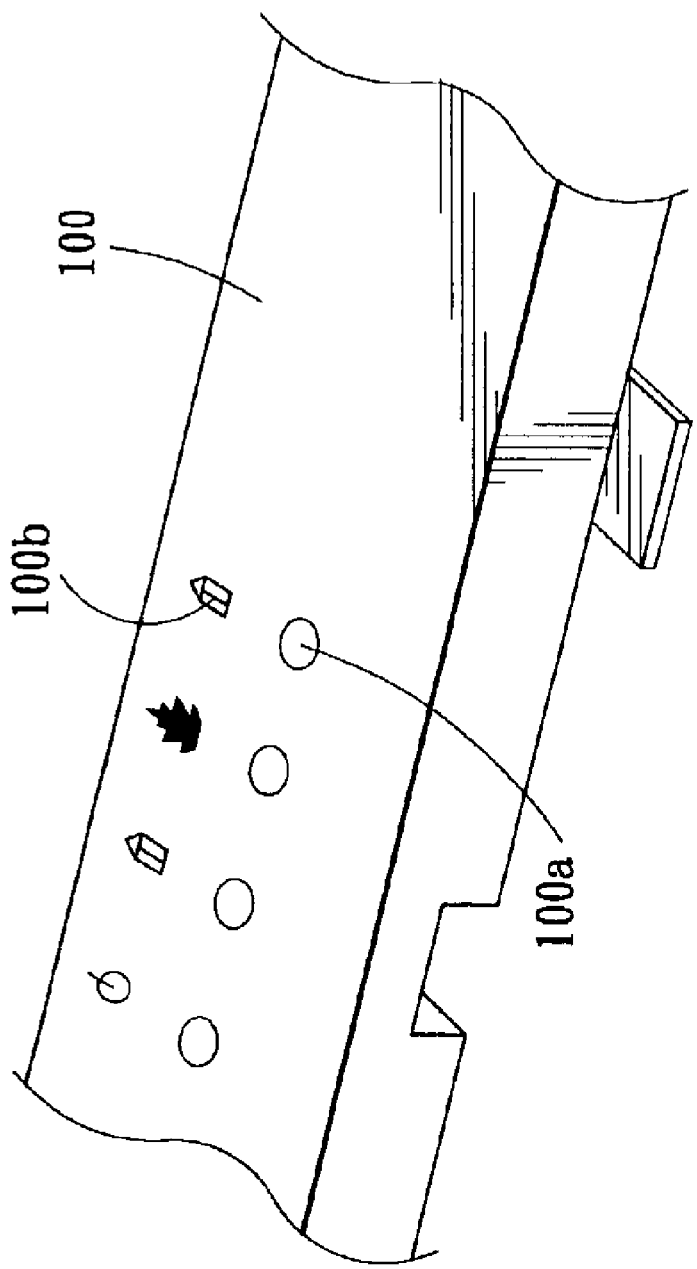
FIG. 1 is a schematic view showing a local enlarged view of the conventional first case.
Figure 2:
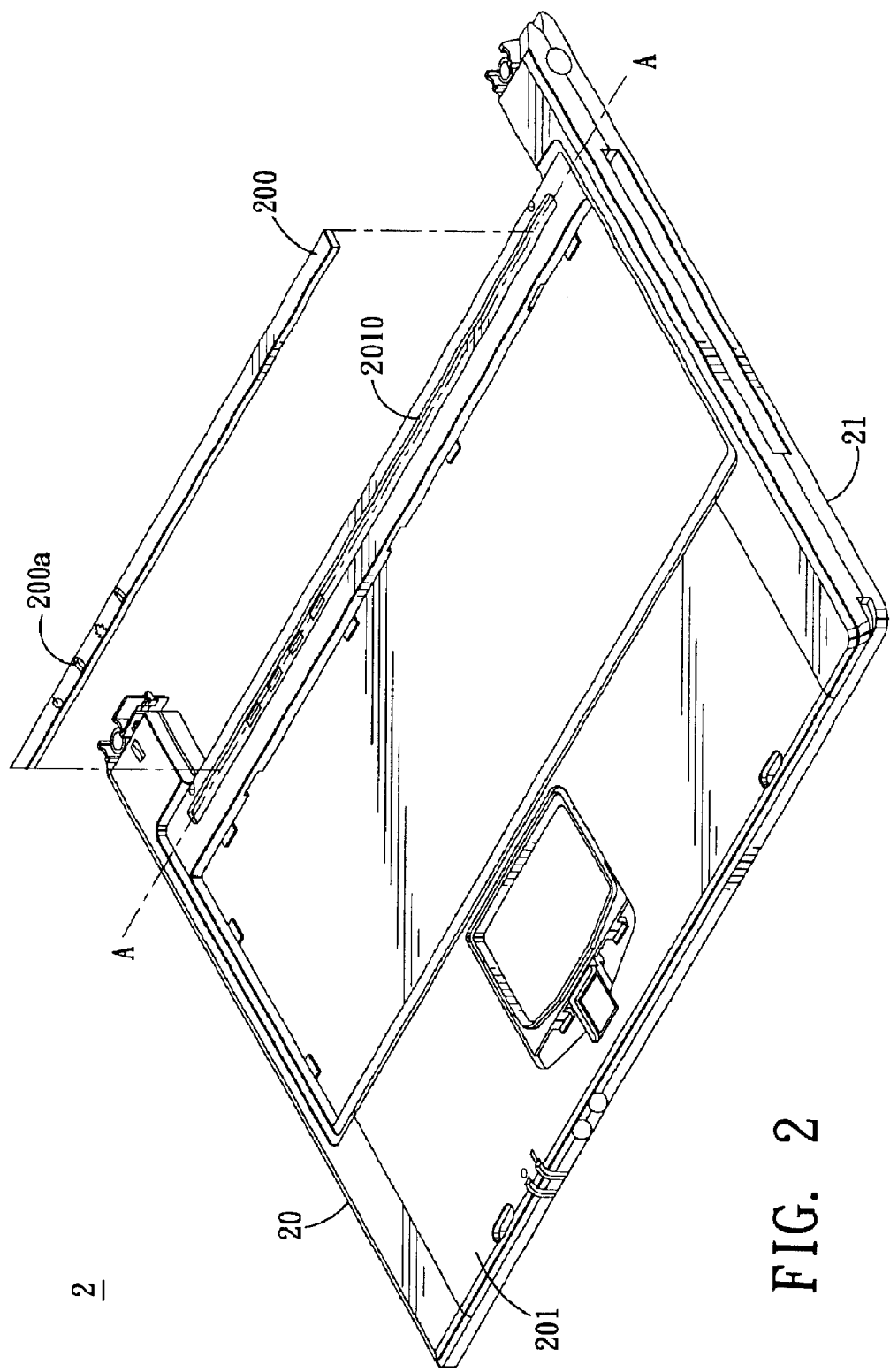
FIG. 2 is a schematic view showing an electronic device according to a preferred embodiment of the invention.
Figure 3:
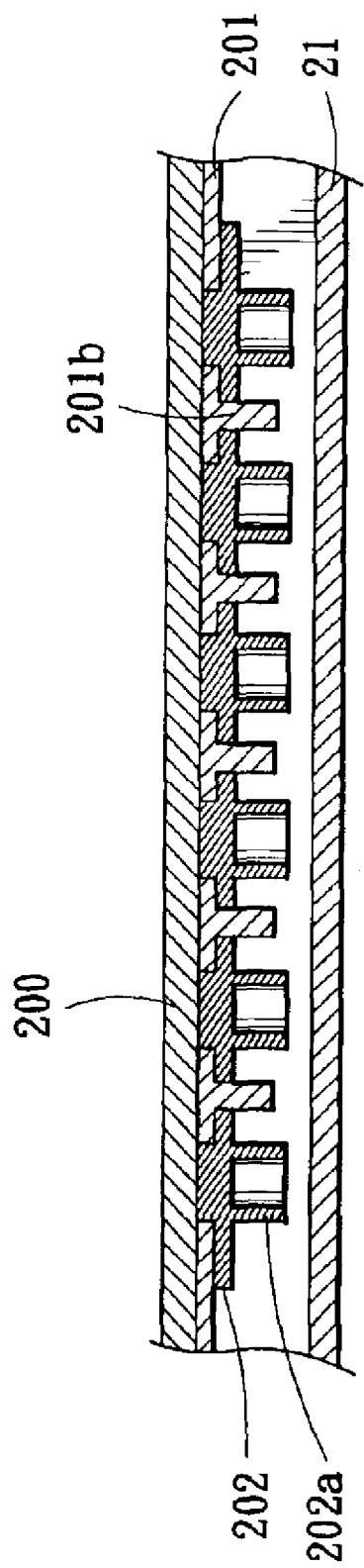
FIG. 3 is a schematic view showing a sectional view along the A—A plane.

As indicated in FIGS. 2 and 3 (FIG. 3 is a sectional diagram along the A—A plane in FIG. 2), an electronic device 2 of the invention includes a first case 20 and a second case 21. In this embodiment, the first case 20 further includes a transparent component 200, a main case body 201, and a light-transmitting component 202.

As shown in FIG. 2, at least one first indicating mark 200a is formed on a surface of the transparent component 200. In this embodiment, there are a plurality of first indicating marks 200a formed on a surface of the transparent component 200. The first indicating marks 200a can be power indicating marks, hard disc busy indicating marks, indicating marks for E-mail sending and receiving, or indicating marks for fast internet use of the electronic device 2. The first indicating marks can also be formed on the transparent component 200 by utilizing printing method.

Please refer to FIG. 2 again, the main case body 201 has at least one light-transmitting hole 201a while the transparent component is placed on a surface of the main case body 201. In the present embodiment, the main case body 201 has a plurality of light-transmitting holes 201a, so that the first indicating marks 200a are posited on a side of the light-transmitting holes 201. In addition, a concave 2010 can be formed on a surface of the main case body 201, so that the light-transmitting holes 201a are formed in the concave 2010. Furthermore, a plurality of second indicating marks (not shown) can be formed on a surface of the main case body 201. The second indicating marks are provided adjacent to the light-transmitting holes 201a. Each second indicating mark has the same graph with the corresponding first indicating mark 200a. Moreover, a plurality of light-block portions 201b can be set on the other surface of the main case body 201, wherein the light-block portion and the light-transmitting portion are provided next to each other. Therefore, the light-block portion can block the light interference between the light emitting components, and avoid the misunderstanding of users that the electronic device is used in another status.

Figure 4:
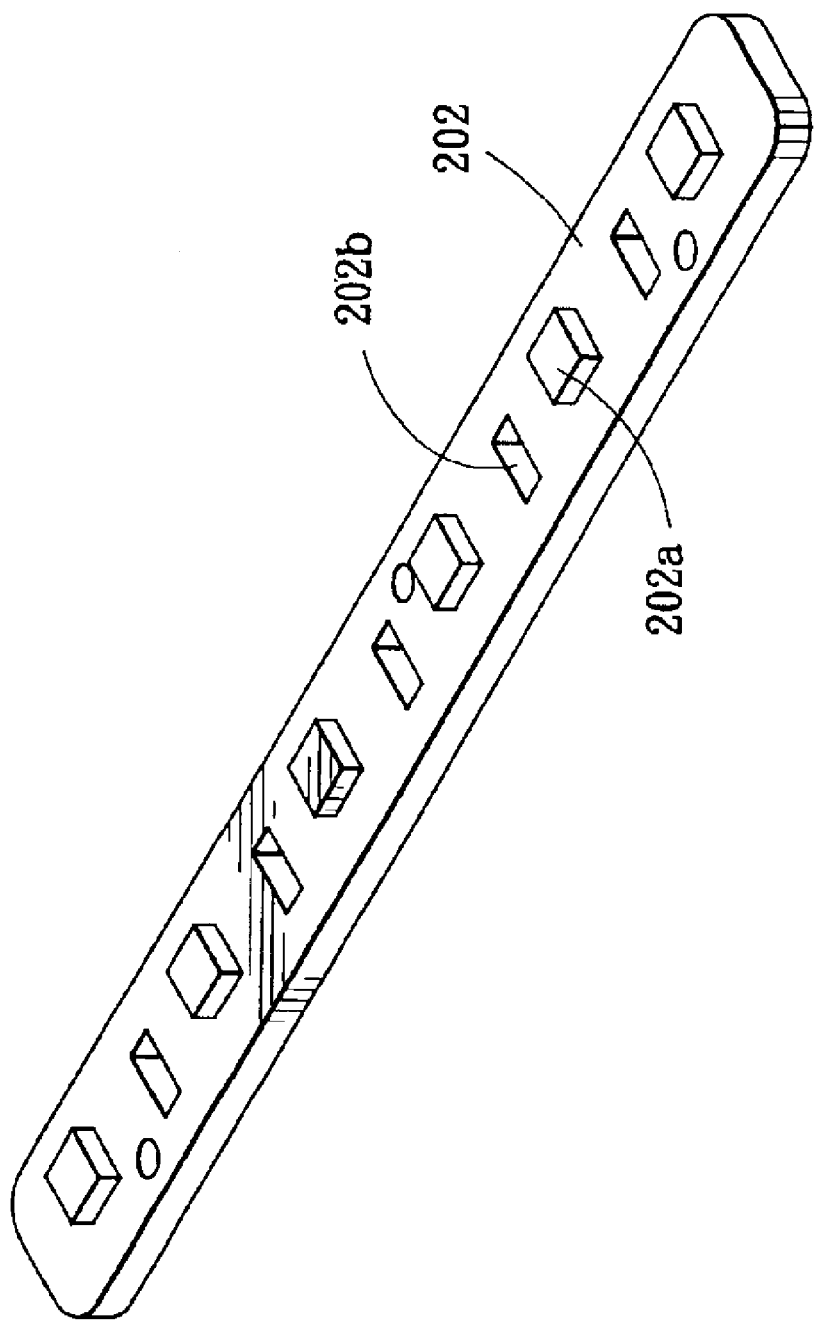
FIG. 4 is a perspective schematic view showing a light-transmitting component of an electronic device according to a preferred embodiment of the invention.

Please refer to FIG. 4 showing a perspective view of the light-transmitting component 202, the light-transmitting component 202 is set on the other surface of the main case body 201, and the light-transmitting component 202 has at least one light-transmitting portion 202a. In this embodiment, a plurality of light-transmitting portions 202a are included in the light-transmitting component 202, and each light-transmitting portion 202a is set corresponding to each first indicating mark opposite to each light-transmitting hole 201a. It should be noticed that the light-transmitting components 202a of this embodiment can be set corresponding to the upper and lower surface of the light-transmitting component, so that people who skilled in the art can realize that it is able to insert the light-transmitting portion 202a into the light-transmitting hole 201a. Therefore, the light-transmitting component 202 can be fixed onto the main case body 201 for protecting the light -emitting component. On the other hand, the light-transmitting portion 202a can also fixed the light-emitting component. In addition, the light-transmitting component 202 also has a plurality of through holes 202b, wherein the through holes 202b and the light-block portion 201b are interlinked. People who skilled in the art can then easily understand that it is able to set the light-transmitting component 202 and the main case body 201 more strongly.

After that, a second case 21 cooperates and combines with the first case 20. In the present embodiment, the first case 21 can be an upper case of a notebook computer or keyboard.

Furthermore, the invention also discloses a case for an electronic device, which is equal to the first case 20 of the electronic device 2 described above.

To sum up, in the electron device and case of the invention, the first indicating mark is formed on the transparent component, so the first indicating mark appears via the illumination of a light-emitting component. Therefore, the users can tell the status in use of their electronic devices. In addition, due to the formation of the first indicating mark on the transparent component, instead of changing the whole case, someone can only change the transparent component if the first indicating mark is damaged or when he/she would like to change the indicating marks. Thus, it is easier to replace elements of electronic devices.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A case for an electronic device, comprising:

a transparent component having at least a first indicating mark formed on a surface of the transparent component;

a main case body having at least a light-transmitting hole, the transparent component being attached to a surface of the main case body and the first indicating mark being set on a side of the light-transmitting hole; and a light-transmitting component having at least a light-transmitting portion and being attached to another surface of the main case body corresponding to the transparent component, so that the light-transmitting portion being set on another side of the light-transmitting hole opposite to the first indicating mark.

2. The case of claim 1, wherein the main case body further has a concave and the light-transmitting hole is set in the concave.

3. The case of claim 2, wherein the light-transmitting component is set in the concave.

4. The case of claim 1, wherein a second indicating mark is set on one surface of the main case body and is adjacent to the light-transmitting hole.

5. The case of claim 1, wherein a light-block portion is formed on the surface of the main case body, on which the light-transmitting component is attached, the light-transmitting component has at least a through hole, and the light-block portion is mounted through the through hole whereby the light-block portion and the light-transmitting portion are provided next to each other.

6. An electronic device, comprising:

a first case, which comprises a transparent component, a main case body, and a light-transmitting component, the transparent component having at least a first indicating mark formed on a surface of the transparent component, the main case body having at least a light-transmitting hole, the transparent component being attached to a surface of the main case body, the first indicating mark being set on a side of the light-transmitting hole, and the light-transmitting component having at least a light-transmitting portion and being attached to another surface of the main case body corresponding to the transparent component, so that the light-transmitting portion being set on another side of the light-transmitting hole opposite to the first indicating mark; and a second case, which is cooperated and combined with the first case.

7. The electronic device of claim 6, wherein the first case is an upper case of a notebook computer.

8. The electronic device of claim 6, wherein the first case is an upper case of a keyboard.

9. The electronic device of claim 6, wherein the main case body further has a concave and the light-transmitting hole is set in the concave.

10. The electronic device of claim 9, wherein the light-transmitting component is set in the concave.

11. The electronic device of claim 6, wherein a second indicating mark is set on one surface of the main case body and is adjacent to the light-transmitting hole.

12. The electronic device of claim 6, wherein a light-block portion is formed on the surface of the main case body, on which the light-transmitting component is attached, the light-transmitting component has at least a through hole whereby the light-block portion and the light-transmitting portion are arranged next to each other.

* * * * *